United States Patent [19]

Tanaka et al.

[11] Patent Number: 4,766,487
[45] Date of Patent: Aug. 23, 1988

[54] CHROMINANCE SIGNAL PROCESSING CIRCUIT

[75] Inventors: Yutaka Tanaka; Osamu Matsunaga, both of Kanagawa, Japan

[73] Assignee: Sony Corporation, Tokyo, Japan

[21] Appl. No.: 81,348

[22] Filed: Aug. 4, 1987

[30] Foreign Application Priority Data

Aug. 13, 1986 [JP] Japan ............................ 61-190080
Aug. 14, 1986 [JP] Japan ............................ 61-190992

[51] Int. Cl.$^4$ ............................................. H04N 9/64
[52] U.S. Cl. .............................. 358/40; 358/36; 358/37
[58] Field of Search ................ 358/40, 37, 31, 38, 358/36

[56] References Cited

U.S. PATENT DOCUMENTS

| | | | |
|---|---|---|---|
| 4,443,817 | 4/1984 | Faroujda | 358/36 X |
| 4,604,645 | 8/1986 | Lewis, Jr. | 358/40 X |
| 4,612,570 | 9/1986 | Nakagaki et al. | 358/36 |
| 4,651,196 | 3/1987 | Harwood et al. | 358/40 X |
| 4,672,429 | 6/1987 | Faroujda et al. | 358/36 |

Primary Examiner—James J. Groody
Assistant Examiner—Victor R. Kostak
Attorney, Agent, or Firm—Philip M. Shaw, Jr.

[57] ABSTRACT

A chrominance signal processing circuit having N (N≧2) band-pass filters for dividing a chrominance signal into N regions and N signal processing circuits respectively having different noise eliminating characteristics from each other and each being connected in series to a different one of the N band-pass filters, and means for synthesizing the outputs from the N signal processing circuits to obtain a chrominance signal wherein noise and cross color interference are suppressed.

10 Claims, 6 Drawing Sheets

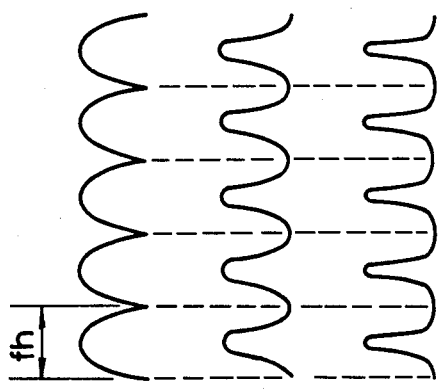
FIG. 9A
FIG. 9B
FIG. 9C
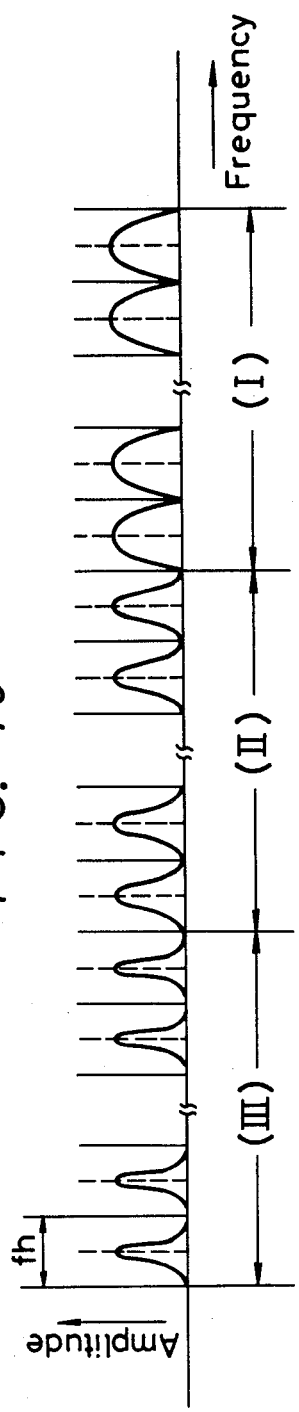
FIG. 10

CHROMINANCE SIGNAL PROCESSING CIRCUIT

BACKGROUND OF THE INVENTION

1. Field of the Invention

The present invention relates generally to a chrominance signal processing circuit and more particularly to a processing circuit of this kind which is suitable for use in demodulation of a wide band chrominance signal.

2. Description of the Prior Art

Recently, various techniques have been proposed for achieving a high resolution, for example, by widening the band of the luminance signal. With such a tendency to require higher resolutions, the definition of color of an image is also desired to be higher.

FIG. 1 shows a frequency spectrum of a composite video signal of the NTSC system. The frequency spectrum is formed of a luminance signal Y and chrominance signals I and Q. As is well known, the luminance signal Y and the chrominance signals I and Q are composed in a frequency interleaved relation.

It can be seen from FIG. 1 that the signal I has a band of 1.5 MHz, and the signal Q a band of 0.5 MHz. If the signals I and Q are reproduced with high fidelity while these bands are maintained, the definition of color of the image can be made high.

Incidentally, the band of a chrominance signal is limited to 0.5 MHz for presently manufactured television receivers so as to get rid of complicated chrominance signal reproducing circuits.

As described above, in order to reproduce the signals I and Q with high fidelity, it is required to widen the band of the chrominance signal separated from a composite video signal. However, so-called wide band demodulation, which is effected by separating a wide band chrominance signal by the use of a comb filter or the like, causes a lot of noise and cross color interference.

OBJECTS AND SUMMARY OF THE INVENTION

In view of the above mentioned problems, it is an object of the present invention to provide a chrominance signal processing circuit which is capable of widening the band of the chrominance signal as well as suppressing the occurrence of noise and cross color interference.

According to one aspect of the present invention, there is provided a chrominance signal processing circuit comprising:

N band-pass filters for dividing a chrominance signal into N regions, where N is an integer which is $\leq 2$, and N signal processing circuits respectively having different noise eliminating characteristics from each other and connected to the N band-pass filters in series, wherein the outputs from the N signal processing circuits are synthesized to obtain a chrominance signal.

These and other objects, features and advantages of the present invention will become apparent from the following detailed description of the preferred embodiment taken in conjunction with the accompanying drawings, throughout which like reference numerals designate like elements and parts.

BRIEF DESCRIPTION OF THE DRAWINGS

FIGS. 9A to 9C are graphs showing frequency characteristics of the respective separating filters appearing in FIG. 8;

FIG. 10 is a graph for explaining the embodiment of FIG. 8; and

DESCRIPTION OF THE PREFERRED EMBODIMENTS

Now, an embodiment of the present invention will hereinafter be described with reference to FIG. 2.

Figure 1:
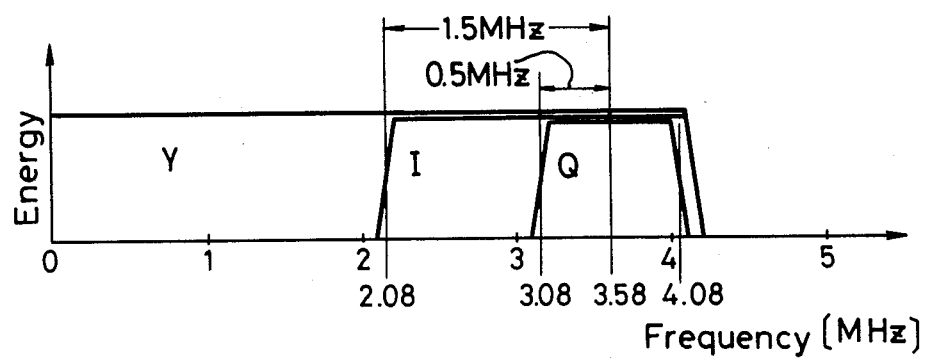
FIG. 1 is a graph showing a frequency spectrum of a composite video signal.
Figure 2:
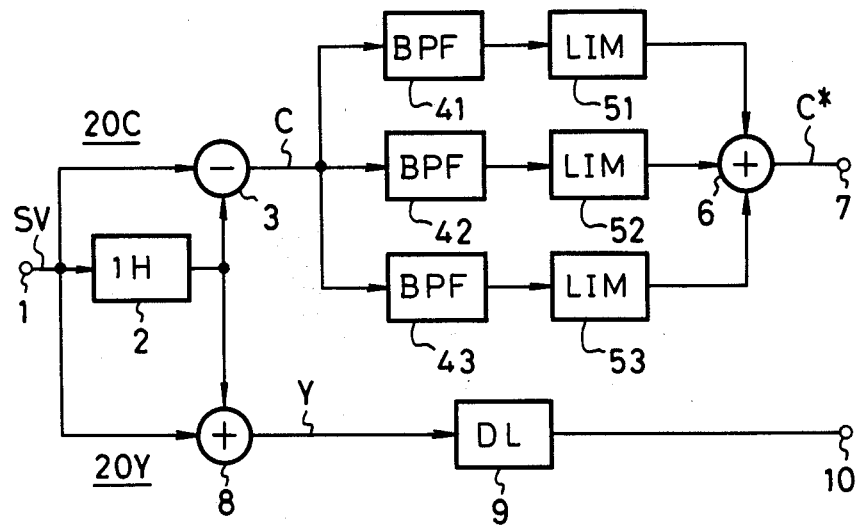
FIG. 2 is a block circuit diagram showing a circuit arrangement of an embodiment of the present invention.

In FIG. 2, reference numeral 1 designates a terminal which is supplied with a composite video signal SV (refer to FIG. 1) of the NTSC system. The video signal SV delivered to the terminal 1 is supplied to one input of a subtractor 3 and to a delay line 2 having a delay of one horizontal line period (1H). A C type comb filter 20C is comprised of the delay line 2 and the subtractor circuit 3. A chrominance signal C from the C type comb filter 20C is supplied to band-pass filters 41, 42 and 43. These band-pass filters 41, 42 and 43 respectively have, for example, a band (I)=3.08 MHz to 4.08 MHz, a band (II)=2.58 MHz to 3.08 MHz and a band (III)=2.08 MHz to 2.58 MHz. Output signals from the band-pass filters 41, 42 and 43 are respectively supplied to limiters 51, 52 and 53.

Figure 3:
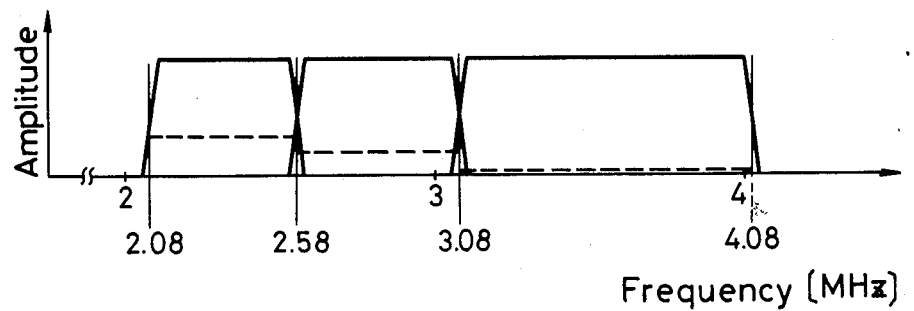
FIG. 3 is a graph showing pass bands of the band-pass filters appearing in FIG. 2.
Figure 4A:
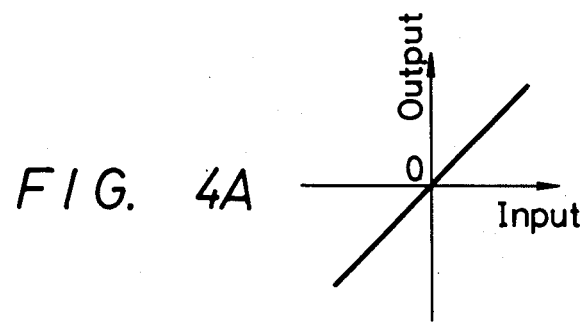
FIGS. 4A to 4C are graphs showing input/output characteristics of the respective limiters appearing in FIG. 2.
Figure 4B:
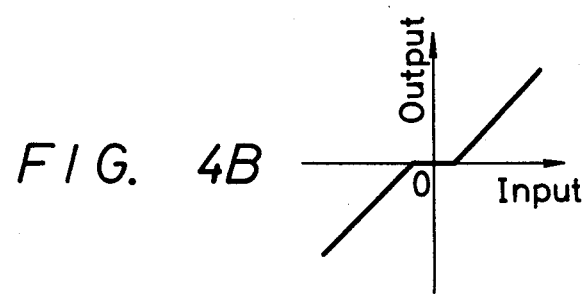
Figure 4C:
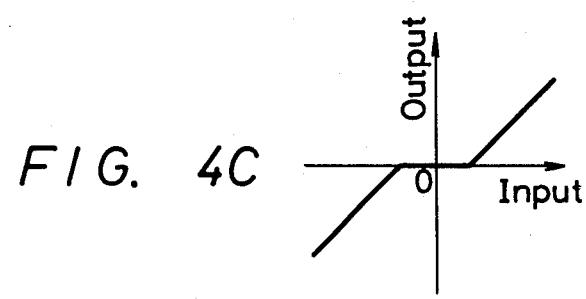

FIGS. 4A, 4B and 4C show input/output characteristics of the limiters 51, 52 and 53, respectively. The dead zones of the limiters 51, 52 and 53 become wider in the order as shown in FIGS. 4A, 4B and 4C. FIG. 4A shows that the dead zone of the limiter 51 is determined to be 0. Levels shown by broken lines in FIG. 3 also show the dead zone levels of the respective limiters 51, 52 and 53.

The separate output signals from the limiters 51, 52 and 53 are all supplied to an adder circuit 6 to be added to each other. An output signal from the adder circuit 6 is delivered to a terminal 7 as a chrominance signal C*.

The video signal SV delivered to the terminal 1 is also supplied to an adder 8. A Y type comb filter 20Y is formed of the delay line 2 and the adder 8. A luminance signal Y separated by the Y type comb filter 20Y is delivered to a terminal 10 through a delay line 9. The delay line 9 is provided to adjust the timing of the luminance signal Y corresponding to a delay of the chrominance signal C* caused by the band-pass filters 41 to 43 and the limiters 51 to 53.

In the circuit arrangement as described above, the band bass filters 41, 42 and 43 respectively output chrominance signals (containing the luminance signal components and noise components) of the band (I)=3.08 MHz to 4.08 MHz, the band (II)=2.58 MHz to 3.08 MHz and the band (III)=2.08 MHz to 2.58 MHz. These chrominance signals in turn are supplied to the limiters 51, 52 and 53, respectively. The limiters 51, 52 and 53 set signals within the respective dead zone levels determined for each of the limiters 51 to 53 to 0. By the operation described above, the chrominance signal C* delivered to the terminal 7 has a band in the whole range from 2.08 MHz to 4.08 MHz. Further, a higher frequency band of the chrominance signal, that is, a band which is located further away from the chrominance subcarrier (3.58 MHz), has its low level components limited in a larger degree. In other words, in the higher band of the chrominance signal, noise components and luminance signal components included in the chrominance signal are limited (i.e. removed) to a larger degree. It is therefore possible to widen a chrominance signal band while suppressing the occurrence of noise and cross color interference by virtue of the use of the chrominance signal C* delivered to the terminal 7.

Figure 5:
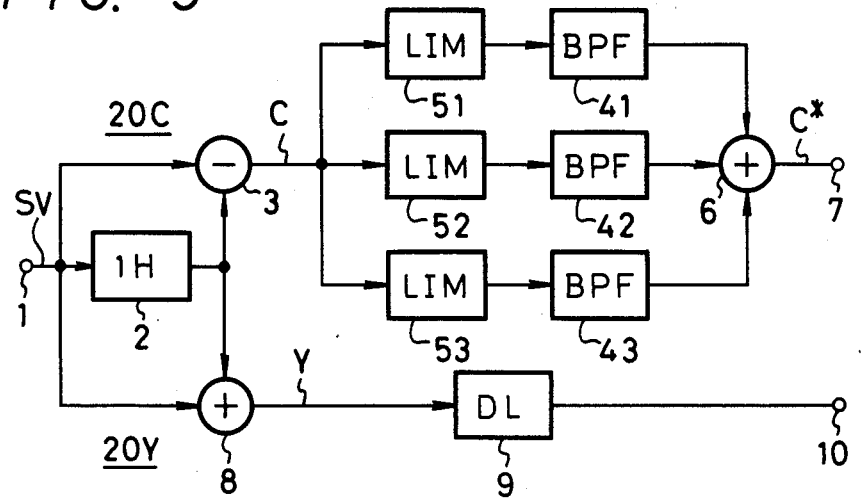
FIG. 5 is a block circuit diagram showing another embodiment of the present invention.
Figure 6:
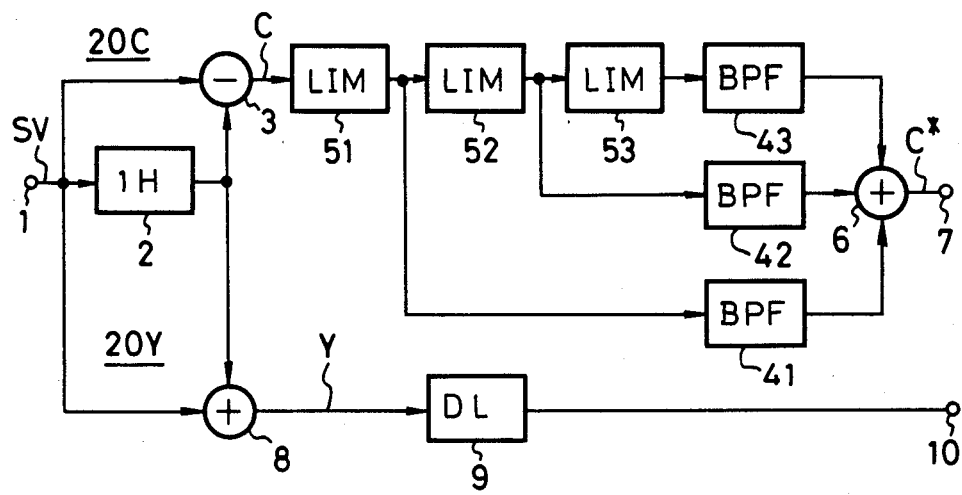
FIG. 6 is a block circuit diagram showing a further embodiment of the present invention.

FIGS. 5 and 6 respectively show other embodiments of the present invention, in which the elements corresponding to those of FIG. 2 are designated by the same reference numerals so that the explanation thereof will be omitted.

In the embodiment shown in FIG. 5, each of the band-pass filters 41 to 43 and the corresponding limiters 51 to 53 have their positions interchanged with each other as compared with the embodiment shown in FIG. 1. In a modification of this embodiment, as shown in FIG. 6, the limiters 51 to 53 are connected in series. Also in these embodiments shown in FIGS. 5 and 6, the chrominance signal C* delivered from the adder circuit 6 to the terminal 7 has a band in the whole range from 2.08 MHz to 4.08 MHz, and the chrominance signal in the higher band has its low level components limited in a larger degree. It will therefore be understood that the circuit arrangements in FIGS. 5 and 6 can also achieve the same effects as that of FIG. 2.

Incidentally, in the above embodiments the chrominance signal band in the range of 2.08 MHz to 4.08 MHz are divided into three regions. However, the chrominance signal band may be divided into two or many more regions.

According to the embodiments of the invention as described above, the chrominance signal processing circuit divides the chrominance signal band into a plurality of regions and limits the lower region signal components to a larger degree than in the higher regions by the use of the limiters which operate with different dead zone levels from each other in the respective regions, whereby the chrominance signal band can be made wide while the occurrence of noise and cross color interference is suppressed.

Next, a description will be given of a further embodiment of the present invention with reference to FIG. 7.

Figure 7:
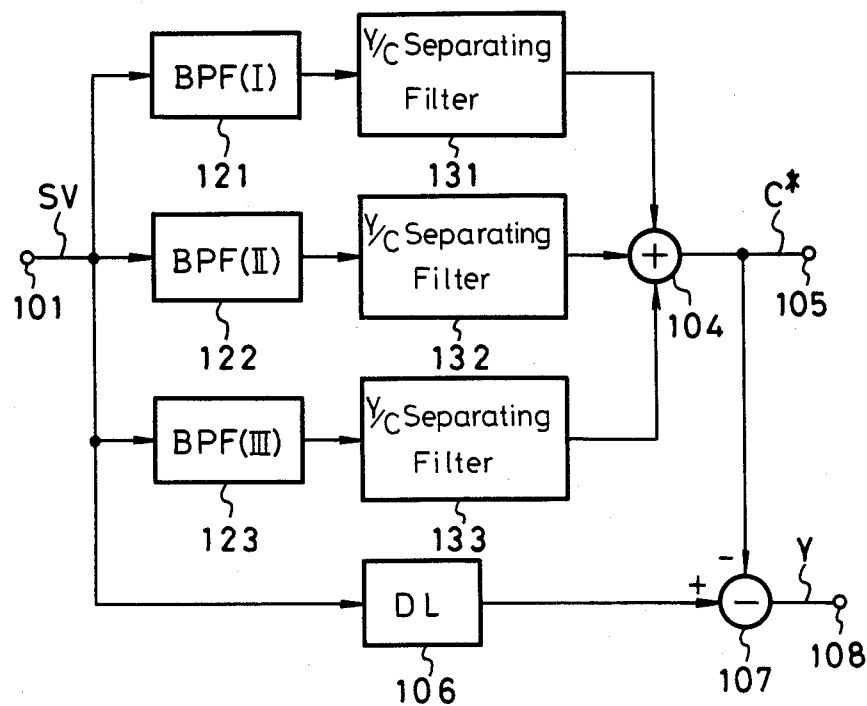
FIG. 7 is a block circuit diagram showing yet a further embodiment of the present invention.

In FIG. 7, a terminal 101 is supplied with a composite video signal SV (refer to FIG. 1) of the NTSC system. The video signal SV is then supplied in common to band-pass filters 121, 122 and 123 which respectively have the pass band (I)=3.08 MHz to 4.08 MHz, the pass band (II)=2.58 MHz to 3.08 MHz and the pass band (III)=2.08 MHz to 2.58 MHz, in the same manner as the aforementioned embodiment shown in FIG. 3.

Figure 8:
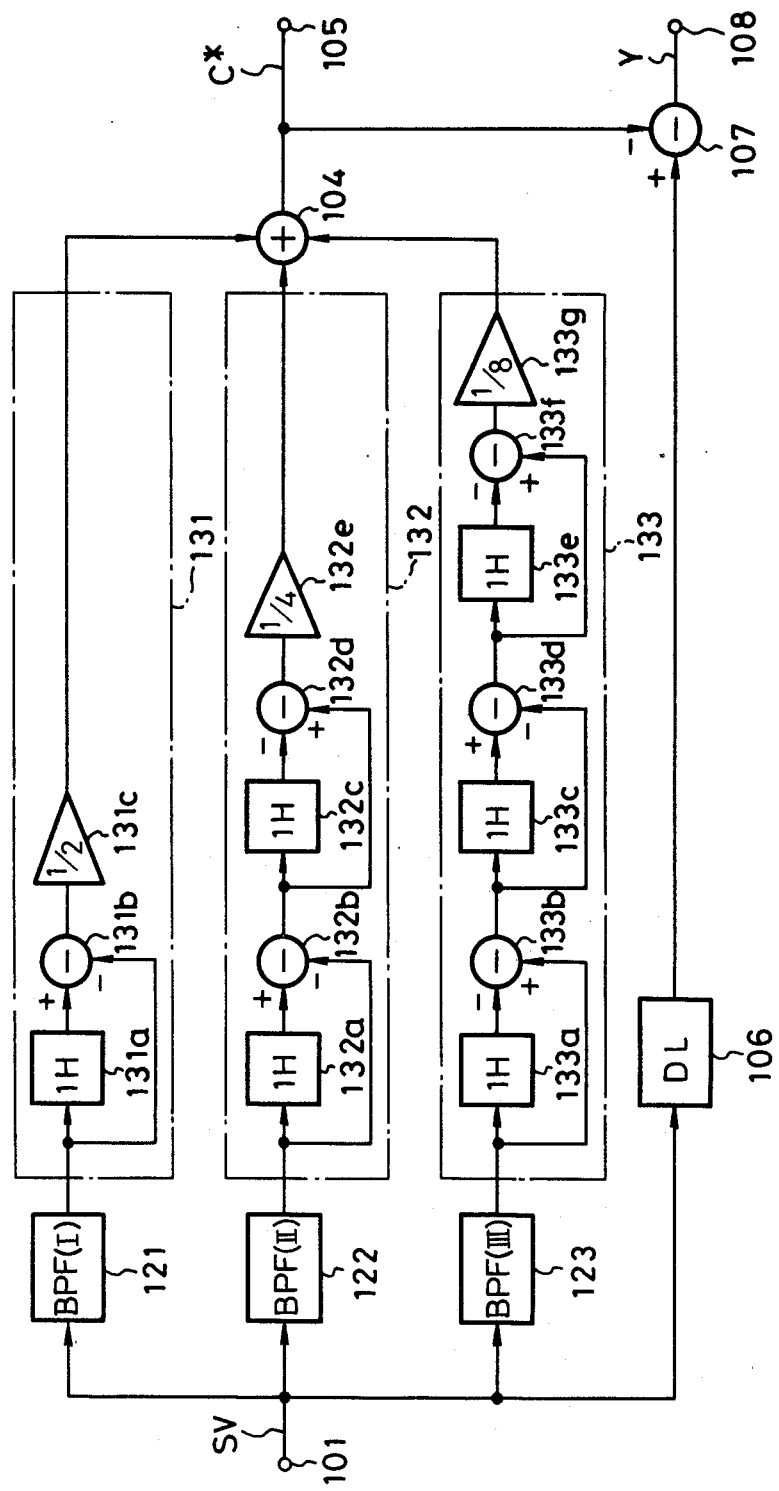
FIG. 8 is a circuit block diagram showing the circuit arrangement of FIG. 7 in detail.

Output signals from the band-pass filters 121, 122 and 123 are respectively supplied to luminance signal/chrominance signal separating filters 131, 132 and 133 which are constructed, for example, as shown in FIG. 8. The separating filter 131 is a so-called 1H comb filter which is formed of a serial circuit of a C type comb filter comprising a delay line 131a having a delay time of one horizontal period (1H) and a subtractor 131b, whose inputs are the output and input of the delay line 131a, and a level regulator 131c for reducing the signal level output from the subtractor 131b by ½. The separating filter 132 is a so-called 2H comb filter which is formed of a serial circuit of a C type comb filter comprising a delay line 132a having a delay time of one horizontal period (1H) and a subtractor 132b, whose inputs are the input and output of the delay line 132a, a C type comb filter comprising a delay line 132c having a delay time of 1H and a subtractor 132d, whose inputs are the input and output of the delay line 132c, and a level regulator 132e for reducing the signal level output by the subtractor 132d by ¼. The separating filter 133 is a so-called 3H comb filter which is formed of a serial circuit of a C type comb filter comprising a delay line 133a having a delay time of one horizontal period (1H) and a subtractor 133b, whose inputs are the input and output of the delay line 133a, a C type comb filter comprising a delay line 133c having a delay time of 1H and a subtractor 133d, whose inputs are the input and output of the delay line 133c, a C type comb filter comprising a delay line 133e having a delay time of 1H and a subtractor 133f, whose inputs are the input and output of the delay line 133e, and a level regulator 133g for reducing the signal level output by the subtractor 133f by ⅛.

The frequency to amplitude characteristics of the separating filters 131, 132 and 133 are respectively shown in FIGS. 9A, 9B and 9C wherein reference letter $f_h$ designates the horizontal frequency. As is apparent from FIGS. 9A to 9C, the comb characteristics of the filters 131, 132 and 133 are such that the separating filter 132 has a pass band narrower than that of the separating filter 131 and the separating filter 133 has a pass band narrower than that of the separating filter 132.

Output signals from the separating filters 131, 132 and 133 are all supplied to an adder circuit 104 to be added to each other. The output signal from the adder circuit 104 is delivered to a terminal 105 as a chrominance signal C*.

A subtractor circuit 107 is supplied with the video signal SV from the terminal 101 through a delay line 106 as well as the output signal from the adder circuit 104. The output signal from the subtractor circuit 107 is delivered to a terminal 108 as a luminance signal Y. The delay line 106 is provided to adjust the timing of the video signal SV corresponding to a delay of the chrominance signal C* caused by the band pass filters 121 to 123 and the separating filters 131 to 133. When the separating filters 131 to 133 are arranged as shown in FIG. 8, the delay time of the delay line 106 is set to be 1H+α("α" designates a delay time caused by the band-pass filters 121 to 123).

In the circuit arrangement as described above in connection with FIGS. 7 and 8, the band pass filters 121, 122 and 123 respectively output video signals of the band (I)=3.08 MHz to 4.08 MHz, the band (II)=2.58 MHz to 3.08 MHz and the band (III)=2.08 MHz to 2.58 MHz, as shown in FIG. 3. These signals are in turn supplied to the separating filters 131, 132 and 133, respectively. As will be understood from the frequency to amplitude characteristics of the separating filters 131, 132 and 133 as shown in FIGS. 9A to 9C, the total frequency to amplitude characteristic of the band-pass filters 121 to 123 and the separating filters 131 to 133 become as shown in FIG. 10. More specifically, FIG. 10 shows the C type comb characteristics wherein a higher band, that is, a band which is located further away from the chrominance subcarrier (3.58 MHz) has a narrower pass band.

Thus, the chrominance signal C* delivered to the terminal 105 covers the entire band from 2.08 MHz to 4.08 MHz. Further, in a higher band of the chrominance signal wherein the luminance signal has a larger energy, the band in the vertical direction is limited so that the luminance signal component is limited and the noise component is reduced, too. Therefore, by virtue of the use of the chrominance signal C* delivered to the terminal 105, the chrominance signal band can be made wide while the occurrence of noise and cross color interference is suppressed.

In the circuit arrangement of FIG. 7, the positions of the band-pass filters 121 to 123 and their corresponding separating filters 131 to 133 may be interchanged with each other.

Figure 11:
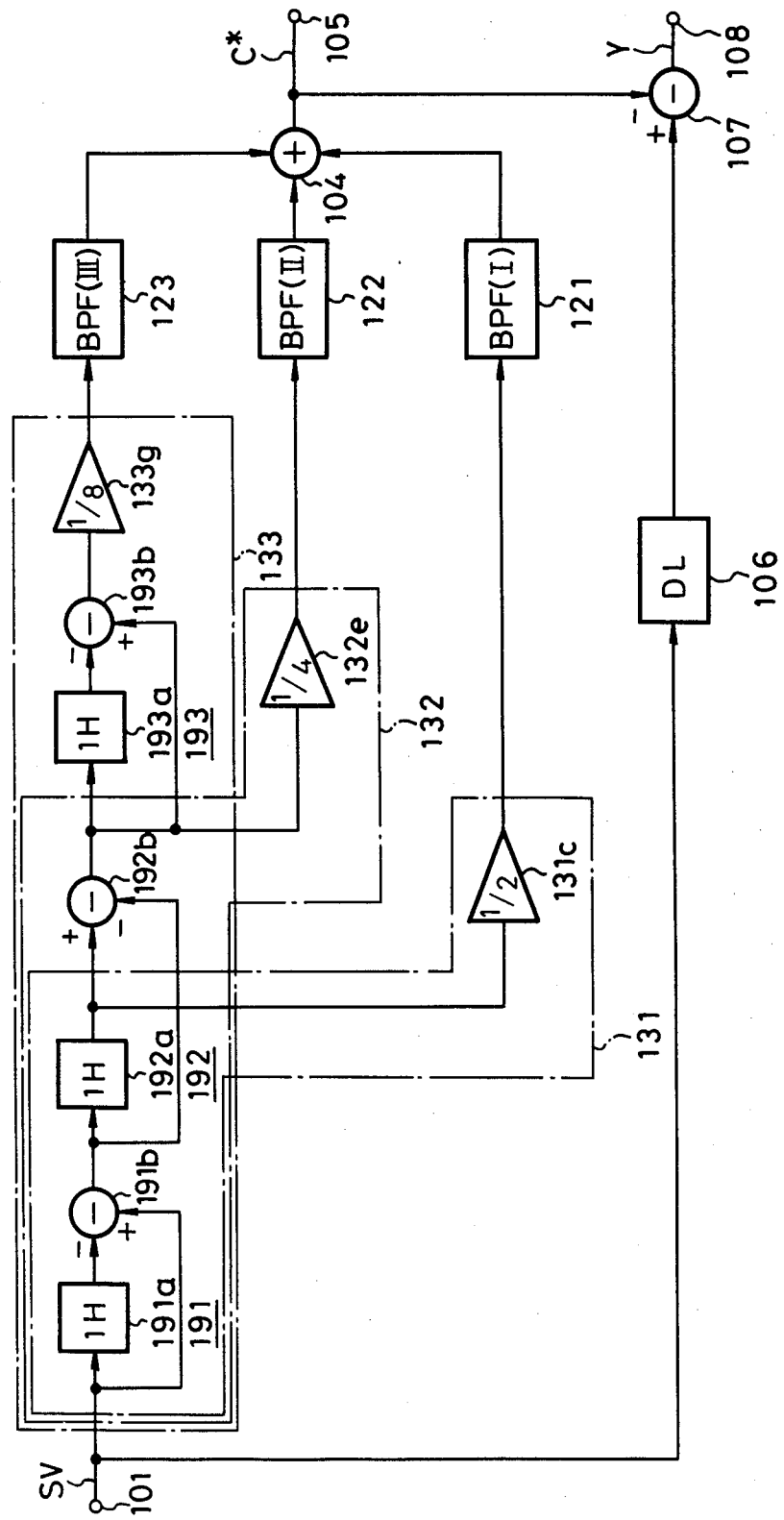
FIG. 11 is a block diagram showing a still further embodiment of the present invention.

FIG. 11 shows a further embodiment of the present invention in which the separating filters are formed of three C type comb filters. In FIG. 11, the elements corresponding to those in FIGS. 7 and 8 are designated by the same reference numerals so that the explanation thereof will be omitted.

The video signal SV delivered to the terminal 101 is supplied to a C type comb filter 191 comprising a delay line 191a having a delay time of 1H and a subtractor 191b. The output signal from the C type comb filter 191 is supplied to a C type comb filter 192 comprising a delay line 192a having a delay time of 1H and a subtractor 192b. The output from the C type comb filter 192 is supplied to a C type comb filter 193 comprising a delay line 193a having a delay time of 1H and a subtractor 193b. The output signal from the C type comb filter 193 is supplied to the adder circuit 104 through a serial circuit of a level regulator 133g and the band-pass filter 123. The output signal from the C type comb filter 192 is also supplied to the adder circuit 104 through a series circuit of a level regulator 131e and the band-pass filter 122. The output signal from the delay line 192a is supplied to the adder circuit 104 through a series circuit of a level regulator 131c and the band-pass filter 121. The remaining of the circuit arrangement of FIG. 11 is the same as that of FIGS. 7 and 8.

In the embodiment shown in FIG. 11, the comb filter 191 and the level regulator 131c constitute the separating filter 131 which has the frequency to amplitude characteristic as shown in FIG. 9A. The comb filters 191 and 192 and the level regulator 132e constitute the separating circuit 132 which has the frequency to amplitude characteristic as shown in FIG. 9B. Further, the comb filters 191, 192 and 193 and the level regulator 133g constitute the separating filter 133 which has the frequency to amplitude characteristic as shown in FIG. 9C.

Therefore, the total frequency to amplitude characteristic of the separating filters 131 to 133 and the band-pass filters 121 to 123 is a C type comb characteristic wherein a higher band has a narrower pass band, as shown in FIG. 10.

Thus, the chrominance signal C* delivered to the terminal 105 covers the entire band from 2.08 MHz to 4.08 MHz. Further, in the higher band of the chrominance signal wherein the luminance signal has a larger energy, the band in the vertical direction is limited so that the luminance signal components are limited and noise components are reduced. It will therefore be understood that the embodiment of FIG. 11 can produce the same effects as that of FIG. 7.

In the above described embodiments, the chrominance signal band ranging from 2.08 MHz to 4.08 MHz is divided into three regions. However, the band may be divided into two or many more regions. For example, if the band is divided into N regions, it is sufficient that the relationship $N \geq 2$ is established.

According to the embodiments of the present invention described in connection with FIGS. 7 to 11, as described above, the chrominance signal band is divided into a plurality of regions, a higher band of the chrominance signal has the band in the vertical direction limited by luminance signal/chrominance signal separating filters which respectively have different frequency to amplitude characteristics from each other and are provided for the respective divided regions, so that the luminance signal is limited and also noise is reduced, whereby the chrominance signal band can be made wide while the occurrence of noise and cross color interference is suppressed.

The above description is given to preferred embodiments of the invention but it will be apparent that many modifications and variations could be effected by one skilled in the art without departing from the spirit or scope of the novel concepts of the invention so that the scope of the invention should be determined by the appended claims only.

We claim as our invention:

1. A chrominance signal processing circuit comprising:
   N band-pass filters, where N is an integer $\geq 2$, for dividing a chrominance signal into N regions;
   N signal processing circuits, each having a separate output, and respectively having different noise eliminating characteristics from each other and being connected to said N band-pass filters in series; and
   means for synthesizing the outputs from said N signal processing circuits to obtain a chrominance signal.

2. A chrominance signal processing circuit comprising:
   means for dividing a chrominance signal band into signal components in a plurality of regions and
   means for limiting the signal components of the lower region to a larger degree than in the higher regions, said means for limiting including a plurality of limiters which operate with different dead zone levels from each other in the respective regions, whereby the chrominance signal band can be made wide while the occurrence of noise and cross color interference is suppressed.

3. A chrominance signal processing method comprising the steps of:
   dividing a chrominance signal band into signal components in a plurality of regions; and
   limiting the signal components of the lower region to a larger degree than in the higher regions by means of a plurality of limiters which operate with different dead zone levels from each other in the respective regions, whereby the chrominance signal band can be made wide while the occurrence of noise and cross color interference are suppressed.

4. A chrominance signal processing circuit comprising:
N band-pass filters, where N is an integer $\leq 2$, for dividing a chrominance signal into N regions;
N signal processing circuits, which are respectively limiters, each of which operates in a different dead zone level from each other and each having a separate output, and respectively having different noise eliminating characteristics from each other and being connected to said N band-pass filters in series; and
means for synthesizing the outputs from said N signal processing circuits to obtain a chrominance signal.

5. A chrominance signal processing circuit comprising:
N band-pass filters, where N is an integer $\geq 2$, for dividing a chrominance signal into N regions;
N luminance signal/chrominance signal separating circuits, each of which has a different frequency to amplitude characteristic from each other, each having a separate output, and respectively having different noise eliminating characteristics from each other and being connected to said N band-pass filters in series; and
means for synthesizing the outputs from said N signal processing circuits to obtain a chrominance signal.

6. A chrominance signal processing circuit as claimed in claims 4 or 5, wherein each of said signal processing circuits is connected in series with a different one of said band-pass filters.

7. A chrominance signal processing circuit as claimed in claims 4 or 5, wherein N is selected to be three.

8. A chrominance signal processing circuit as claimed in claim 4, further comprising a comb filter for separating said chrominance signal from a composite video signal.

9. A chrominance signal processing circuit as claimed in claim 5, wherein said N luminance signal/chrominance signal separating circuits are respectively comb filters each using a 1H delay line.

10. A chrominance signal processing circuit as claimed in claim 5, wherein N is selected to be three, and said N luminance signal/chrominance signal separating circuits are a 1H comb filter, a 2H comb filter and a 3H comb filter, respectively.

* * * * *